United States Patent [19]

Al-Jaroudi

[11] Patent Number: 4,655,610
[45] Date of Patent: Apr. 7, 1987

[54] VACUUM IMPREGNATION OF SINTERED MATERIALS WITH DRY LUBRICANT

[75] Inventor: Mohammed Y. Al-Jaroudi, Stockholm, Sweden

[73] Assignee: International Business Machines Corporation, Armonk, N.Y.

[21] Appl. No.: 800,881

[22] Filed: Nov. 22, 1985

[30] Foreign Application Priority Data

Feb. 13, 1985 [SE] Sweden .................. 8500671

[51] Int. Cl.$^4$ .................. B05D 3/02; F16C 33/02; F16C 33/12
[52] U.S. Cl. .................. 384/13; 384/279; 384/909; 252/12; 252/12.2; 427/294; 427/385.5
[58] Field of Search .................. 252/12, 12.2, 29, 30; 427/294, 295, 385.5; 384/13, 279, 909

[56] References Cited

U.S. PATENT DOCUMENTS 4,123,122 10/1978 Gabrielson .................. 308/238
4,473,481 9/1984 Fukutsuka et al. .................. 252/12 X
4,532,054 7/1985 Johnson .................. 252/12 X
4,582,368 4/1986 Fujita et al. .................. 384/13

FOREIGN PATENT DOCUMENTS 1122353 1/1962 Fed. Rep. of Germany .
3035772 9/1982 Fed. Rep. of Germany .
55-28350 2/1980 Japan .
56-130409 10/1981 Japan .
135019 10/1976 Norway .
703403 2/1954 United Kingdom .
784165 10/1957 United Kingdom .
1283767 8/1972 United Kingdom .

Primary Examiner—Michael R. Lusignan
Attorney, Agent, or Firm—Curtis G. Rose; David Adour; Maurice H. Klitzman

[57] ABSTRACT

A method for vacuum impregnation of sintered materials, preferably vacuum impregnation of sintered bearings parts, with dry lubricants is disclosed. The impregnation is performed in the following way. The cleaned parts to be impregnated are placed in a glass basin containing a mixture of, for example, molybdenum disulphide and graphite, a thermosetting resin, a solvent and a thermosetting resin extender. The glass basin is placed in a vacuum chamber and the vacuum chamber is then vacuum pumped for a sufficiently long time in order to evacuate the air from the pores of the sintered parts. After that air is again let in into the vacuum chamber until normal air pressure is reached. The sintered parts are taken out and are allowed to air dry. The coating is then cured.

17 Claims, 4 Drawing Figures

U.S. Patent  Apr. 7, 1987  4,655,610
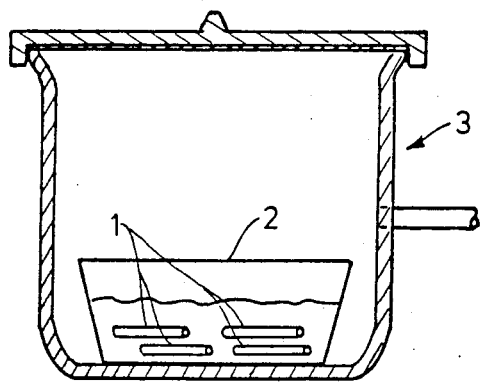
FIG. 1
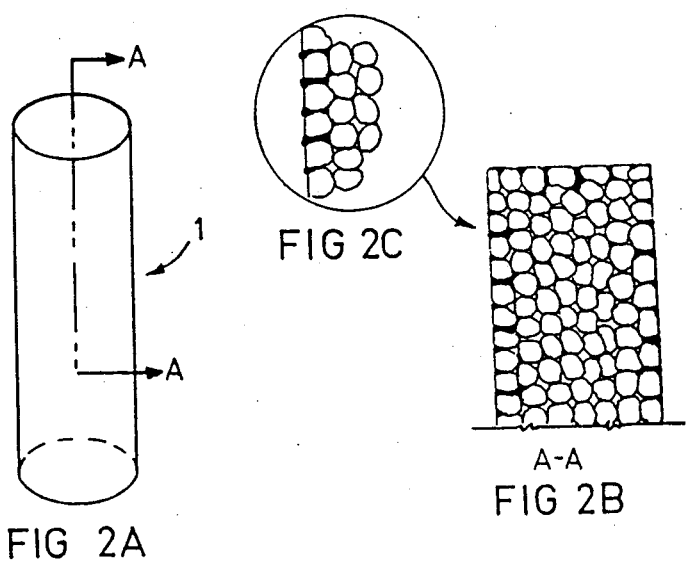
FIG 2A
FIG 2C
A-A
FIG 2B

VACUUM IMPREGNATION OF SINTERED MATERIALS WITH DRY LUBRICANT

BACKGROUND OF THE INVENTION

The present invention relates to vacuum impregnation of sintered materials with dry lubricant, preferably, vacuum impregnation of sintered bearings parts. More particularly, this invention is concerned with vacuum impregnation of bearings parts, so that a supply of a dry lubricant will be integrally contained therein.

It is known that finely divided metals may be sintered under appropriate conditions of heat and pressure to yield a porous structure that can be impregnated with a lubricant. This type of bearing has proved of utility in certain limited applications, but is generally found lacking in that the fugitive lubricant is not tightly held in the interstices of the sintered metal. As a result, the lubricant may bleed out of the bearing under no load conditions or may be extracted therefrom by centrifugal forces if the bearing is subjected to rotation. For this reason, it is generally necessary to provide means to replace the supply of lubricant in such self-lubricated bearings, either continuously or at predetermined intervals.

Metal bearings have also been lined with certain solid non-metallic substances that have low coefficient of friction and will serve as lubricants. Bearings of this type are, for example, those that are lined with low friction resinous materials such as polyethylene and polyamides. Under comparatively light loads these bearings have sometimes proved satisfactory, but they do not have the necessary wear resistance to permit their use under moderate to severe pressure-velocity conditions. Thus, their utility is limited.

A third type of self-lubricated bearing may be prepared by applying a layer of adhesive material to a metal substrate, contacting the adhesive layer with a finely divided absorptive resinous material, and causing the adhesive material to harden, whereby a layer of finely divided synthetic resinous material is bounded to at least the surface of said substrate. The metal substrate may be shaped into the form of a bearing either before or after the finely divided resinous material is applied to the surface. Such a bearing is described in U.S. Pat. No. 3,380,843.

Another similar process is described in U.S. Pat. No. 4,104,176. According to this patent there is applied to the surface of the bearing a matrix of closely spaced, solid discrete particles held together, not through the compaction and sintering of powder metallurgy, but with a bonding material disposed in the interstices between the particles. The bonding material only partially fills the interstices and leaves an interconnected uniform porosity sufficient to provide at the bearing surface the lubricant needed for a lubricant-impregnated bearing. The main disadvantage of the bearings according to these patents is that the fabrication of them is relatively complicated.

SUMMARY OF THE INVENTION

The present invention is intended to remedy the above mentioned drawbacks. Briefly stated, this invention relates to vacuum impregnation of sintered materials with a dry film lubricant and, in particular, vacuum impregnation of sintered bearing's parts with dry film lubricant in order to reduce wear. This is accomplished by applying a dry film lubricant to the surface of the sintered parts in such a way that the dry lubricant is integrally contained within a surface layer of the sintered parts.

The advantages offered by the invention are mainly that all the above mentioned disadvantages are eliminated and that the preparation of the sintered parts can be done in a very simple and economical way. The increase in life time of the parts prepared according to the invention has proved to be several times more as compared with prior known technique. The method is applicable to already existing manufacturing process without change of dimension/tolerance of bearing details. Besides, the impregnation protects the pores of the parts from smut and humidity which may cause corrosion of the sintered parts.

BRIEF DESCRIPTION OF THE DRAWINGS

Other objects and advantages of the present invention will be apparent from the following description in conjunction with the accompanying drawings, wherein like reference numerals identify like elements, and in which:

FIG. 1 shows a schematical view of a vacuum chamber for vacuum impregnation of sintered bearings parts with a mixture containing dry lubricant ingredients, according to the principles of the present invention.

FIG. 2A depicts a sintered axle in a bearing made according to the principles of the present invention.

FIG. 2B is a cross sectional, enlarged view, along the line A—A, of part of the axle depicted in FIG. 2A.

FIG. 2C shows a further enlarged surface part of the axle depicted in FIG. 2A which has been impregnated with dry lubricant in accordance with the principles of the present invention.

DESCRIPTION OF THE PREFERRED EMBODIMENT

The present invention is applicable for all sorts of sintered bearings or the like where parts are subjected to wear. The invention is described in detail below with reference to the drawings. FIG. 1 shows in schematical form a vacuum chamber 3 for use in connection with the invention. The application of the dry film lubricant is accomplished in the following way. Cleaned parts 1 to be impregnated are placed in glass basin 2 containing a mixture of, for example, molybdenum disulphide and graphite, a thermosetting resin, a solvent and a thermosetting resin extender. The glass basin 2 is placed in a vacuum chamber 3 and the vacuum chamber 3 is then vacuum pumped for a sufficiently long time in order to evacuate the air from the pores of the sintered parts 1. After that, air is again let in into the vacuum chamber 3 until normal air pressure is reached. When the pressure rises in the vacuum chamber 3 the mixture is forced into those pores of the sintered parts 1 which are in connection with the surface and therefore have been air evacuated. When the normal air pressure has been reached the parts 1 are taken out and are allowed to air dry for 10 to 15 minutes. The coating is then cured by bringing the substrate temperature to 180° C. for one hour or to 210° C. for thirty minutes.

FIG. 2A shows a sintered axle 1 in a bearing. FIG. 2B is a cross sectional view of an enlarged part of said axle 1 showing how the axle 1 is built up of finely divided solid particles which has been sintered together under pressure and heat leaving pores therebetween. Some of these pores are completely closed while others are connected to the surface of the axle 1. FIG. 2C shows a further enlarged surface part of the axle 1 which has been impregnated in accordance with the present invention. The dry lubricant has been forced into and fills those pores which are in direct connection with the surface. Further, the dry lubricant extends from the pores slightly above said surface and thus constitutes the only contact between the axle and the other bearing part (not shown).

Of course the foregoing description is directed to one particular embodiment of the present invention and various modifications and other embodiments of the present invention will be apparent to one of ordinary skill in the art to which the present invention pertains. Therefore, while the present invention has been described in conjunction with a particular embodiment it is to be understood that various modifications and other embodiments of the present invention may be made without deporting from the scope of the present invention as described herein and as claimed in the appended claims.

What is claimed is:

1. A method for vacuum impregnation of a sintered material with a dry lubricant comprising the steps of:
   placing the sintered material in a basin containing a mixture of effective amounts of the dry lubricant and a thermosetting resin dissolved in a solvent;
   placing the basin in a vacuum chamber;
   vacuum pumping the vacuum chamber for a sufficiently long time in order to evaluate the air from the pores of the sintered material;
   letting air into the vacuum chamber until normal air pressure is reached, thereby driving said mixture into said evacuated pores;
   air drying the sintered material; and
   curing the dry lubricant, said dry lubricant extending slightly above said pores.

2. The method according to claim 1, wherein the dry lubricant comprises molybdenum disulphide and graphite.

3. The method according to claim 2 wherein the mixture further comprises a thermosetting resin extender.

4. The method according to claim 1 wherein the mixture further comprises a thermosetting resin extender.

5. The method according to claim 1 wherein the step of curing comprises bringing the substrate temperature to 180° C. for one hour or to 210° C. for thirty minutes.

6. The method according to claim 2 wherein the step of curing comprises bringing the substrate temperature to 180° C. for one hour or to 210° C. for thirty minutes.

7. The method according to claim 3 wherein the step of curing comprises bringing the substrate temperature to 180° C. for one hour or to 210° C. for thirty minutes.

8. The method according to claim 4 wherein the step of curing comprises bringing the substrate temperature to 180° C. for one hour or to 210° C. for thirty minutes.

9. The methods according to claim 1 wherein the step of air drying the sintered material comprises:
   removing the sintered material from the vacuum chamber; and
   allowing the sintered material to air dry for 10 to 15 minutes.

10. The method according to claim 2 wherein the step of air drying the sintered material comprises:
    removing the sintered material from the vacuum chamber; and
    allowing the sintered material to air dry for 10 to 15 minutes.

11. The method according to claim 3 wherein the step of air drying the sintered material comprises:
    removing the sintered material from the vacuum chamber; and
    allowing the sintered material to air dry for 10 to 15 minutes.

12. The method according to claim 4 wherein the step of air drying the sintered material comprises:
    removing the sintered material from the vacuum chamber; and
    allowing the sintered material to air dry for 10 to 15 minutes.

13. The method according to claim 5 wherein the step of air drying the sintered material comprises:
    removing the sintered material from the vacuum chamber; and
    allowing the sintered material to air dry for 10 to 15 minutes.

14. The method according to claim 6 wherein the step of air drying the sintered material comprises:
    removing the sintered material from the vacuum chamber; and
    allowing the sintered material to air dry for 10 to 15 minutes.

15. The method according to claim 7 wherein the step of air drying the sintered material comprises:
    removing the sintered material from the vacuum chamber; and
    allowing the sintered material to air dry for 10 to 15 minutes.

16. The method according to claim 8 wherein the step of air drying the sintered material comprises:
    removing the sintered material from the vacuum chamber; and
    allowing the sintered material to air dry for 10 to 15 minutes.

17. A wear resistant bearing for reducing wear between said bearing and a second bearing part, said wear resistant bearing comprising:
    a sintered bearing having a plurality of pores;
    a dry lubricant integrally contained within and extending slightly above said pores, said dry lubricant further comprising effective amounts of molybdenum disulphide, graphite and a cured resin, wherein said dry lubricant constitutes the only contact between said wear resistant bearing and said second bearing part.

* * * * *